United States Patent [19]

Yoshihara

[11] Patent Number: 4,805,527
[45] Date of Patent: Feb. 21, 1989

[54] SHELL-CRACKING APPARATUS FOR HARD-SHELL COATED SEEDS

[76] Inventor: Masazumi Yoshihara, 1-12, Kawara-machi, Naka-ku, Hiroshima-shi, Hiroshima-ken, Japan

[21] Appl. No.: 143,953

[22] Filed: Jan. 14, 1988

[30] Foreign Application Priority Data

Feb. 22, 1987 [JP] Japan .................................. 62-12939

[51] Int. Cl.⁴ .............................................. A23N 5/00
[52] U.S. Cl. ......................................... 99/571; 99/519
[58] Field of Search .................. 99/568, 571, 572, 580, 99/581–583, 600, 609, 518, 519; 426/481, 482

[56] References Cited

U.S. PATENT DOCUMENTS

| | | | |
|---|---|---|---|
| 4,441,414 | 4/1984 | Quantz | 99/571 |
| 4,467,710 | 8/1984 | Verma et al. | 99/582 X |
| 4,515,076 | 5/1985 | Reznik | 99/571 |

FOREIGN PATENT DOCUMENTS

| | | |
|---|---|---|
| 272679 | 3/1931 | Japan . |
| 13-16535 | 10/1938 | Japan . |
| 402280 | 1/1940 | Japan . |
| 61171551 | 8/1968 | Japan . |
| 52-17515 | 4/1977 | Japan . |

Primary Examiner—Timothy F. Simone
Attorney, Agent, or Firm—Cushman, Darby & Cushman

[57] ABSTRACT

Disclosed is a shell-cracking apparatus for hard-shell coated seeds including a hopper in which the seeds of pine nuts are put. When a seed-receiving plate is vibrated by driving a motor in this state, the seeds enter the grooves of that plate. Thereafter, the seeds are guided downwards into an outer cylindrical member via a cylindrical seed-discharging member into which they have dropped from said plate. At, or at around, this time, a cock of an air injection pipe is opened. A compressed air is injected from a small air injection bore of an air injection pipe supporting plug member into the outer cylindrical member. The seeds are thereby quickly forced into a funnel portion of a seed ejection pipe supporting plug member. Then, while the seeds pass through the seed ejection pipe, which is slightly larger in diameter than the longitudinal sizes of the seeds, the seeds fly with their pointed ends toward the advancing direction of the seeds, until they violently collide against the central holes formed in a pad plate, perhaps because the air stream is greater in speed around the center of the pipe than on the inner peripheral surfaces of the pipe.

1 Claim, 4 Drawing Sheets

FIG.9    FIG.8    FIG.10    FIG.11
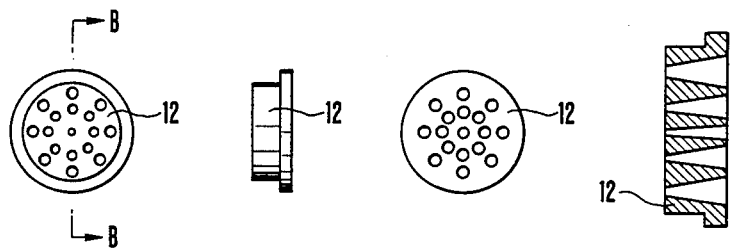
FIG.13    FIG.12    FIG.14
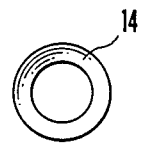      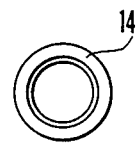
FIG.16    FIG.15    FIG.17
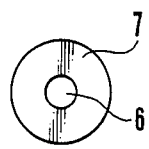   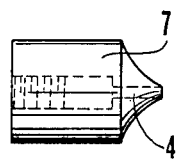   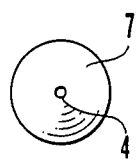
FIG.19    FIG.18    FIG.20
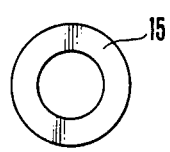   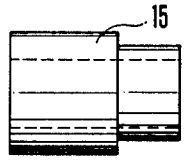   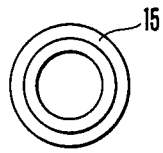

SHELL-CRACKING APPARATUS FOR HARD-SHELL COATED SEEDS

BACKGROUND OF THE INVENTION

1. FIELD OF THE INVENTION

The present invention is intended to crack the shells of pine nuts and relates to an improvement in a shell cracking apparatus which has now been on file in the form of a Japanese Patent Application No. 60-10393 as filed by the present Applicant under date of Jan. 22, 1985 (Japanese Patent Unexamined Publication No. 61-171551 dated Aug. 20, 1986).

Hard-shell coated seeds such as, for example, gingko nut, pine nut, or the like are used for cooking after their shells have been taken away and then processed, or are processed into confectionaries or foodstuff for use as "sake and sakana (eatables)" which is thus put on sale. Pine nuts in particular are coated with hard shells, and their seeds contain a large amount of fat and yet are soft. Thus, pine nuts are highly nutritious foodstuff and are considered to increase in their future demand.

2. DESCRIPTION OF THE PRIOR ART

The shell-cracking apparatuses which are disclosed in Japanese Utility Model Examined Publications Nos. 13-16535, 402280, and 27-2679 have hitherto been proposed as shell-cracking means for hard-shell coated seeds. These shell-cracking apparatuses are inefficient and therefore are unsuitable for cracking the shells of a large number of pine nuts. On the other hand, the shell-cracking apparatus which is disclosed in Japanese Utility Model Examined Publication No. 52-17515 has a drawback in that it causes damage to the embryos of the seeds, although it is somewhat higher in the cracking efficiency than the above-mentioned shell-cracking apparatuses.

The shell-cracking apparatus which is now on file in the form of Japanese Patent Application No. 60-10393 has solved the problems of any one of the first-mentioned shell-cracking apparatuses. Namely, it is high in the cracking efficiency and is capable of processing a large number of seeds. This shell-cracking apparatus, however, has structural drawbacks in that the seeds are likely to drop outside a seed discharging cylindrical member without coming into the same, and that the shells and contents of the seeds as cracked are likely to be scattered. This requires assistance by hands in order to make the necessary rearrangements. Thus, the present Applicant has attempted, not only to increase the force of air injection as compared with the shell-cracking apparatus of the pending Japanese Patent Application No. 60-10393, but also to recover the seeds having dropped outside the cylindrical seed-discharging member, to prevent the scattering of the shells and fruits or contents produced due to collision of the seeds against a pad plate, and to speedily discharge the air having impinged upon the pad plate to thereby prevent the blockage of the holes formed in the pad plate, thus to enhance the cracking efficiency.

SUMMARY OF THE INVENTION

The present invention has been made in view of the above-mentioned problems inherent in the prior art and the object thereof is to provide a shell cracking apparatus for hard-shell coated seeds which can solve such problems.

To attain the above object, according to the present invention, there is provided a shell cracking apparatus for hard-shell coated seeds which comprises an outer cylindrical member (1) having a suitable diameter, a cylindrical seed-discharging member (2) having the same diameter as that of the outer cylindrical member (1) and fitted into the outer cylindrical member (1) in a state wherein it is suitably inclined at an angle of approximately 45° or less with respect to a hopper (3) side, an air injection pipe supporting plug member (7) having a small air injection bore (4) at one end and an air injection pipe insertion bore (6) at the other end, the air injection pipe insertion bore (6) being internally threaded, the air injection pipe supporting plug member (7) being inserted into an opening of the outer cylindrical member (1) at the side of the hopper (3) and fixed by fitting a screw (8) into the outer cylindrical member (1), an air injection pipe (5) having one end inserted into the air injection pipe insertion bore (6) and the other end screwed to a compressed air tank (11) after having been mounted with an air-pressure adjusting device (9) and a cock (10), a seed ejection pipe supporting plug member (14) having one end portion opened in the form of a funnel the bottom portion of which is directed toward the other end of the seed ejection pipe supporting plug member (14), and the other end portion formed with a seed-ejection pipe (13) insertion bore, the seed ejection pipe supporting plug member (14) being inserted into an opening of the outer cylindrical member (1) at the side of a pad plate (12), a seed ejection pipe (13) having one end portion inserted into the seed ejection pipe (13) insertion bore of the seed ejection pipe supporting plug member (14) and fixed to the seed ejection pipe supporting plug (14) by fitting a screw (8b) into the outer cylindrical member (1), a pipe supporting plug member (15) having substantially the same size in outer diameter as the size of the inner diameter of the outer cylindrical member (1) and centrally formed with a through bore for permitting the passage therethrough of the seed ejection pipe (13), the seed-ejection pipe (13) being inserted, at the other end, through the pipe supporting plug member (15), or being inserted, at the other end, into the pipe supporting plug member (15) and cut and then another seed-ejection pipe (13) being inserted into the pipe supporting plug member (15) from the opposite side to cause communication between the two seed-ejection pipes (13), the seed-ejection pipe (13) having a diameter slightly larger than the size of the longitudinal portion of a pine nut seed, a second outer cylindrical member (1a) having one end portion cut away, in the form of an arch, at a part lower than the position corresponding to about ½ of the vertical length of the outer cylindrical member (1a), leaving a portion of a longitudinal width for mounting the pad plate (12), a partitioning wall (20) provided on an inner face of the remaining one end portion of the outer cylindrical member (1a) to define a seed cracking chamber (16) in cooperation with the outer cylindrical member (1a), and a seed ejection pipe (13) insertion bore (17) formed in the partitioning wall (20) so as to permit the insertion therethrough of the seed ejection pipe (13) passed through the pipe supporting plug member (15), a tip end portion of the seed ejection pipe (13) being fixed by fitting a screw (8c) into the pipe supporting plug member (15) at a position at which the tip end of the seed ejection pipe (13) is spaced at a suitable distance from the position of the pad plate (12), the pad plate (12) being centrally formed with holes each having a diameter of approximately 3 to 4 mm, the hole being gradually radially increased in diameter toward an outer periphery of the pad plate (12), thereby being tapered, the pad plate (12) being integrally formed, at its outer periphery, with a projection adapted to be engaged with an end edge of the outer cylindrical member (1a), the pad plate (12) being inserted into an opening of the outer cylindrical member (1a) and being fixed by fitting a screw (8d) into the outer cylindrical member (1a) at a position at which the projection is engaged with the end edge portion of the outer cylindrical member (1a), several integral units each consisting of the air injection pipe (5) and the seed ejection pipe (13) being arranged in parallel beneath the hopper (3) so that an opening of the cylindrical seed-discharging member (2) may be located right beneath a seed dropping portion of a seed-receiving plate (18) from which the seeds are allowed to drop down.

The pipes which are employed in the present invention are each made of metal or synthetic resin and are tough enough to resist the pressure of air involved.

BRIEF DESCRIPTION OF THE DRAWINGS

FIG. 8 is a front view of a pad plate;

FIG. 9 is a left side view of the pad plate;

FIG. 10 is a right side view of the pad plate;

FIG. 11 is an enlarged sectional view taken along the line B—B of FIG. 9;

FIG. 12 is a front view of a seed ejection pipe supporting plug member;

FIG. 13 is a left side view of the seed ejection pipe supporting plug member shown in FIG. 12;

FIG. 14 is a right side view of the seed ejection pipe supporting plug member shown in FIG. 12;

FIG. 15 is a front view of an air injection pipe supporting plug member;

FIG. 16 is a left side view of the air injection pipe supporting plug member shown in FIG. 15;

FIG. 17 is a right side view of the air injection pipe supporting plug member shown in FIG. 15;

FIG. 18 is a front view of a pipe supporting plug member;

FIG. 19 is a left side view of the pipe supporting plug member shown in FIG. 18; and FIG. 20 is a right side view of the pipe supporting plug member shown in FIG. 18.

DESCRIPTION OF THE PREFERRED EMBODIMENT

Figure 1:
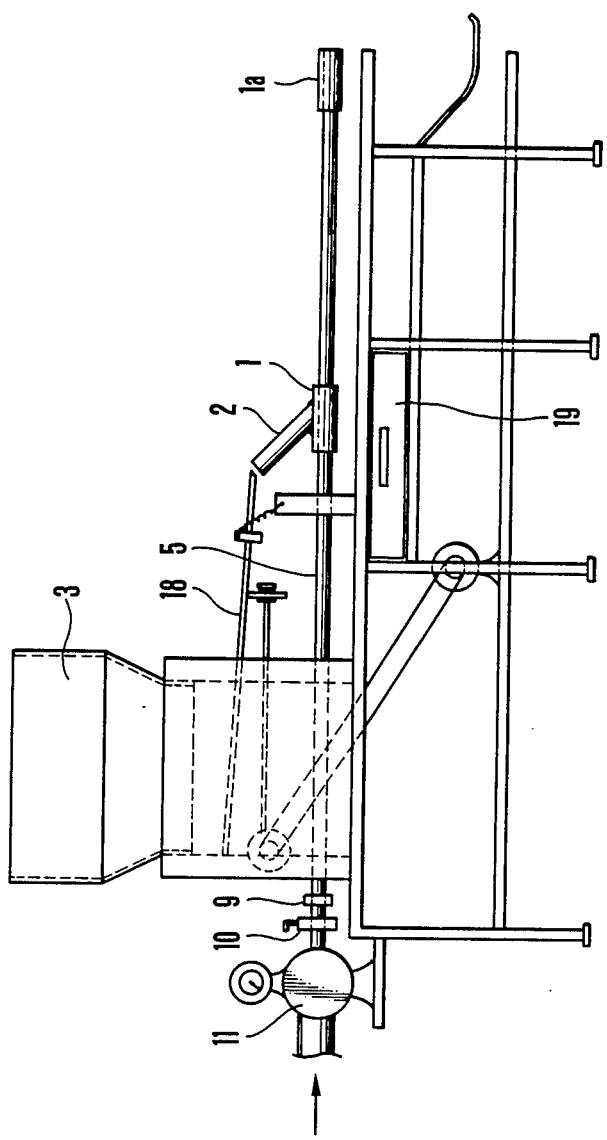
FIG. 1 is a schematic front view of a shell cracking apparatus as a whole.
Figure 2:
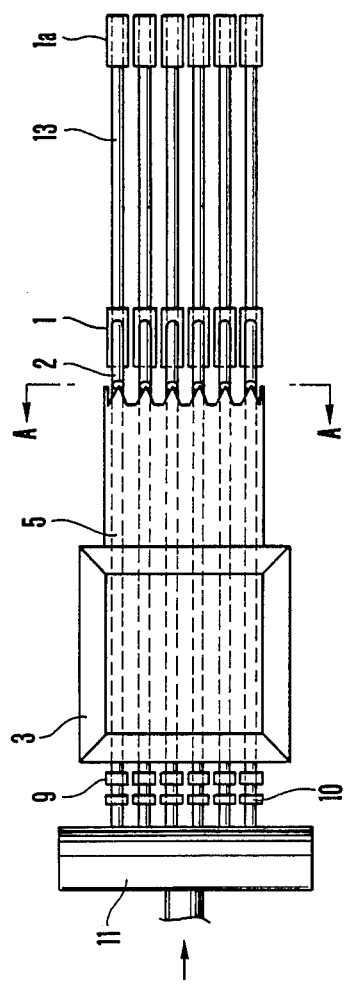
FIG. 2 is a schematic plan view of the shell cracking apparatus as a whole.
Figure 4:
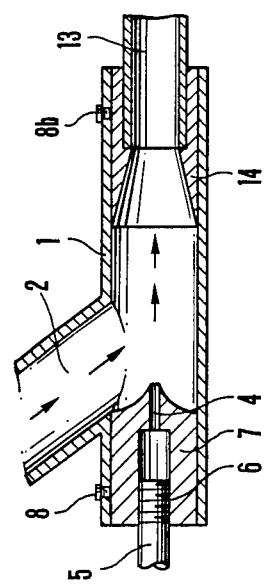
FIG. 4 is an enlarged cross-sectional view of a seed drop section and an air injection pipe supporting plug member.
Figure 3:
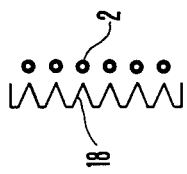
FIG. 3 is a sectional view taken along the line A—A of FIG. 2.
Figure 5:
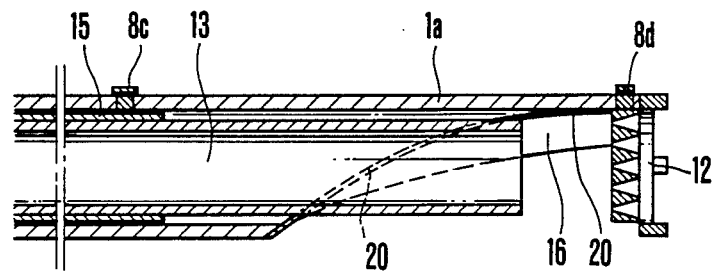
FIG. 5 is an enlarged cross-sectional front view of a seed cracking section.
Figure 6:
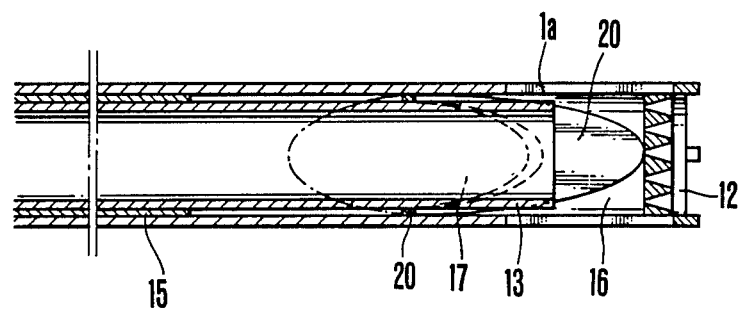
FIG. 6 is an enlarged cross-sectional bottom view of the seed cracking section.
Figure 7:
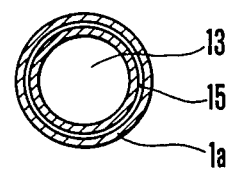
FIG. 7 is a left side view of FIG. 6.

Initially, the seeds of pine nuts are put into a hopper (3). When a seed-receiving plate (18) is caused, in this state, to vibrate by driving a motor, the seeds are introduced into grooves of the seed-receiving plate (18). Thereafter, they are permitted sequentially to move toward a line of fall-off and then are permitted to drop down into a cylindrical seed-discharging member (2), thus being guided downwards into an outer cylindrical member (1). In this case, the seeds which have dropped down without entering the seed-discharging member (2) are allowed to drop down into a box (19) provided beneath the outer cylindrical member (1). This prevents the seeds from being scattered at random.

At, or at around, the time when the seeds have entered the outer cylindrical member (1), a cock (10) of an air injection pipe (5) is opened. Then, a compressed air is injected from a small air injection bore (4) of an air injection pipe supporting plug member (7) into the outer cylindrical member (1). The seeds are thereby quickly forced into a funnel portion of a seed ejection pipe supporting plug member (14). In this case, while the seeds pass through the seed ejection pipe (13), which is slightly larger in diameter than the longitudinal sizes of the seeds, the seeds fly with their pointed ends toward the advancing direction of the seeds, until they violently collide against the central holes formed in a pad plate (12), perhaps because the air stream is greater in speed around the center of the pipe than on the inner peripheral surfaces of the pipe. As a result, the hard shells of the seeds are cracked and broken, while, on the other hand, the fruits or embryos thereof are taken out without being damaged. Since the air is speedily discharged outside by way of the holes of the pad plate (12), the shells and fruits thus obtained are retained by a partitioning wall (20) of a cracking chamber (16) and are allowed to drop downwards without being scattered at random, whereby they can easily be received.

The shell cracking apparatus of the present invention is an improvement in the shell cracking apparatus disclosed in the publication of Japanese Patent Application No. 60-10393 and is the same as the latter in that the seeds can be cracked in 100% irrespective of the sizes, and that the apparatus can be restricted according to the amount of seeds to be cracked. However, the former differs from the latter in that it has the following additional advantages or improved effects. Namely, in cases where the seeds are not caused smoothly to move through the pipe during the seed-cracking operation, adjustment therefor can be made by means of an air pressure adjusting valve (9). Further, since the holes of the pad plate (12) are formed in such a manner that their inner diameter gradually increases toward outside the pad plate (12), the air is quickly discharged outside the pad plate (12) while it is prevented from becoming an eddy flow. Thus, the shells and fruits which have been produced during the cracking operation are prevented from being scattered at random. Further, the seeds which have dropped down by failure to enter the cylindrical seed-discharging member are received by the box (19). This enables such seeds to be transferred again into the seed hopper (3), thus enhancing the operating efficiency. According to the experimental results which have been obtained by the filing date of this application, the seed cracking apparatus of Japanese Patent Application No. 60-10393 has required 40 minutes to crack the seeds of 10 kilograms, whereas the seed cracking apparatus of the present invention has only required 5 minutes to crack the same amount of seeds, i.e., can process the seeds of 80 kilograms for 40 minutes. This fact proves that the effect of the present invention is greatly improved.

What is claimed is:

1. A shell-cracking apparatus for hard-shell coated seeds comprising:
   a hopper having at least one side;

a tank adapted to holding compressed air;

an outer cylindrical member having a suitable diameter and having first and second openings therein;

a cylindrical seed-discharging member having the same diameter as that of said outer cylindrical member and fitted into said outer cylindrical member in a state wherein it is inclined with respect to said hopper side in order to receive seeds dropped from said hopper;

an air injection pipe supporting plug member having first and second ends, with a small air injection bore at said first end and an air injection pipe insertion bore at said second end, said air injection pipe supporting plug member being inserted into said first opening of said outer cylindrical member at said side of said hopper and fixed to said outer cylindrical member;

an air-pressure adjusting device and a cock;

an air injection pipe having first and second ends, said first end being inserted into said air injection pipe insertion bore and said air injection pipe second end fixed to said compressed air tank after having been mounted with said air-pressure adjusting device and said cock;

a seed ejection pipe supporting plug member having first and second ends, said first end portion opened in the form of a funnel the narrow portion of which is directed toward said second end of said seed ejection pipe supporting plug member, said second end portion being formed with a seed-ejection pipe insertion bore, said seed ejection pipe supporting plug member being inserted into said second opening of said outer cylindrical member;

a seed ejection pipe having a diameter slightly larger than about the size of a longitudinal portion of said seeds, said seed ejection pipe having one end portion inserted into said seed ejection pipe insertion bore of said seed ejection pipe supporting plug member and fixed to said seed ejection pipe supporting plug member by a fastener to said outer cylindrical member;

a pipe supporting plug member having substantially the same size in outer diameter as the size of the inner diameter of said outer cylindrical member said pipe supporting plug member being centrally formed with a through bore for permitting the passage therethrough of said seed ejection pipe, said seed ejection pipe being inserted through said pipe supporting plug member;

a second outer cylindrical member having an inner bore and first and second ends said first end portion being cut away, in the form of an arch, at a distance from the tip of said first end, corresponding to about $\frac{1}{2}$ of a vertical length of said second outer cylindrical member;

a partitioning wall provided on the surface of said inner bore at said second end portion of said second outer cylindrical member said partitioning wall having a seed ejection pipe insertion bore, said bore being formed so as to permit the insertion therethrough of said seed ejection pipe passed through said pipe supporting plug member;

a pad plate being formed with tapered bores through said plate each bore having a narrowest diameter of approximately 3 to 4 mm, said bores having increased diameters toward the outer periphery of said pad plate, said pad plate having a projection integrally at its outer periphery, adapted to be engaged with an edge of said second end of said second outer cylindrical member, said pad plate being inserted into said second end of said second outer cylindrical member and being fixed at a position at which said projection is engaged with said edge of said second end of said second outer cylindrical member, there being a plurality of units each including said air injection pipe and said seed ejection pipe, said units being arranged in parallel beneath said hopper to receive said seeds.

* * * * *